United States Patent
Sidebottom et al.

(10) Patent No.: US 8,034,372 B2
(45) Date of Patent: Oct. 11, 2011

(54) DIETARY SUPPLEMENT FOR ATHLETIC PETS

(75) Inventors: Monique Y. Sidebottom, St. Louis, MO (US); Arleigh J. Reynolds, Salcha, AK (US)

(73) Assignee: Nestec, Ltd., Vevey (CH)

( * ) Notice: Subject to any disclaimer, the term of this patent is extended or adjusted under 35 U.S.C. 154(b) by 914 days.

(21) Appl. No.: 10/382,289

(22) Filed: Mar. 5, 2003

(65) Prior Publication Data

US 2004/0175413 A1    Sep. 9, 2004

(51) Int. Cl.
A23K 1/18 (2006.01)
A23K 1/175 (2006.01)
A23K 1/02 (2006.01)

(52) U.S. Cl. .......... 424/442; 426/630; 426/810

(58) Field of Classification Search .......... None
See application file for complete search history.

(56) References Cited

U.S. PATENT DOCUMENTS

| | | | |
|---|---|---|---|
| 4,145,447 A | 3/1979 | Fisher et al. | |
| 4,540,585 A | 9/1985 | Priegnitz | |
| 4,808,602 A * | 2/1989 | Bruschi | 514/347 |
| 4,904,495 A | 2/1990 | Spanier | |
| 4,997,671 A | 3/1991 | Spanier | |
| 5,017,389 A | 5/1991 | Green | |
| 5,087,473 A | 2/1992 | Leo | |
| 5,397,786 A * | 3/1995 | Simone | 514/300 |
| 5,545,410 A | 8/1996 | Fox et al. | |
| 5,932,258 A | 8/1999 | Sunvold | |
| 5,968,569 A | 10/1999 | Cavadini et al. | |
| 5,985,339 A * | 11/1999 | Kamarei | 426/72 |
| 6,051,236 A * | 4/2000 | Portman | 424/725 |
| 6,117,477 A | 9/2000 | Paluch | |
| 6,180,131 B1 | 1/2001 | Sunvold et al. | |
| 6,238,708 B1 | 5/2001 | Hayek et al. | |
| 6,265,450 B1 * | 7/2001 | Asami et al. | 514/691 |
| 6,296,892 B1 * | 10/2001 | Elseviers et al. | 426/653 |
| 6,344,214 B1 * | 2/2002 | Lorenz | 424/451 |
| 6,352,712 B1 * | 3/2002 | Lukaczer et al. | 424/439 |
| 6,379,727 B1 | 4/2002 | Addy | |
| 6,475,512 B1 | 11/2002 | Sunvold et al. | |
| 6,479,069 B1 | 11/2002 | Hamilton | |
| 2001/0043983 A1 | 11/2001 | Hamilton | |
| 2002/0086062 A1 * | 7/2002 | Kuhrts | 424/499 |
| 2002/0182276 A1 | 12/2002 | Wadsworth et al. | |
| 2002/0197275 A1 | 12/2002 | Sunvold et al. | |
| 2003/0012807 A1 | 1/2003 | Sunvold | |
| 2003/0124198 A1 * | 7/2003 | Crum | 424/535 |
| 2003/0143311 A1 * | 7/2003 | Gillota | 426/590 |
| 2004/0115309 A1 * | 6/2004 | Harris | 426/72 |

FOREIGN PATENT DOCUMENTS

| | | |
|---|---|---|
| CH | 554 644 | 10/2004 |
| CN | 1332972 A * | 1/2002 |
| DE | 19811167 A1 * | 9/1999 |
| DE | 199 58 620 A 1 | 6/2001 |
| DE | 199 58 692 A1 | 6/2001 |
| FR | 2 574 631 A | 7/1998 |
| JP | 2002159279 A * | 6/2002 |
| KR | 20030013836 A * | 2/2003 |
| WO | WO 9911251 A1 * | 3/1999 |

OTHER PUBLICATIONS

Yeaman SJ et al., Regulation of glycogen synthesis in human muscle cells, Biochem Soc Trans. Aug. 2001;29(Pt 4):537-41.*
Aoi et al., Astaxanthin limits exercise-induced skeletal and cardiac muscle damage in mice, Antioxid Redox Signal. Feb. 2003;5(1):139-44.*
Gershbein LL., Liver regeneration in rats administered high levels of carbohydrates, Int J Vitam Nutr Res. 1976;46(4):472-9.*
Reynolds et al., Effect of post-exercise carbohydrate supplementation on muscle glycogent repletion in trained sled dogs, AJVR, vol. 58, No. 11, Nov. 1997.*
Ei-Sayed et al. Exogenous Carbohydrate Utilization: Effects on Metabolism and Exercise Performance, Comp. Biochem. Physio. vol. 118A, No. 3, pp. 789-803, 1997.*
Baskin et al., Effects of dietary antioxidant supplementation on oxidative damage and resistance to oxidative damage during prolonged exercise in sled dogs, Am J Vet Res. Aug. 2000;61(8):886-91.*
Power Bar—the Original Performance Energy Bar, Balanced Energy, Optimal Performance, http://www.powerbar.com/products/performance/article.asp, http://www.powerbar.com/products/performance/faq.asp, Jan. 8, 2003.
PCT International Search Report dated Aug. 17, 2004; In re International Application No. PCT/US2004/006513; filed Mar. 4, 2004.

* cited by examiner

Primary Examiner — Michael G Hartley
Assistant Examiner — Nabila Ebrahim
(74) Attorney, Agent, or Firm — K&L Gates LLP

(57) ABSTRACT

A method for helping pets recover from periods of strenuous activity includes providing a source of carbohydrates formulated to provide a readily available replenishment source of glycogen for the pet and providing a replenishment source of vitamins, minerals, and antioxidants which are expended at rates that are higher during the strenuous activity than during non-strenuous activity.

4 Claims, 2 Drawing Sheets

| Ingredient | Min Percentage | Max Percentage |
|---|---|---|
| Brewer's Yeast | 0 | 10 |
| Calcium Phosphate | 0 | 5 |
| Cheese | 0 | 10 |
| Corn Gluten Meal | 0 | 20 |
| Corn Syrup | 0 | 20 |
| Dextrose | 0 | 10 |
| Dried Fruit | 0 | 15 |
| Fat | 0 | 15 |
| Fish | 0 | 30 |
| Glycerine | 0 | 20 |
| Maltodextrin | 0 | 60 |
| Meat | 0 | 30 |
| Mineral Premix | 0 | 3 |
| Molasses | 0 | 10 |
| Nuts | 0 | 15 |
| Oatmeal | 0 | 30 |
| Pearled Barley | 0 | 20 |
| Potassium Gluconate | 0 | 5 |
| Poultry | 0 | 30 |
| Preservative | 0 | 2 |
| Rice | 0 | 20 |
| Rice Flour | 0 | 60 |
| Salt | 0 | 3 |
| Soybean Meal | 0 | 20 |
| Sugar | 0 | 10 |
| Vanilla Flavor | 0 | 1 |
| Vegetable Oil | 0 | 10 |
| Vitamin C | 0 | 5 |
| Vitamin E | 0 | 5 |
| Vitamin Premix | 0 | 3 |
| Wheat | 0 | 15 |
| Wheat Flour | 0 | 15 |
| Yogurt | 0 | 10 |

Fig. 1

| Mineral Pre-mix Ingredient | Percentage |
|---|---|
| Salt | 66 |
| Zinc Sulfate | 16 |
| Ferrous Sulfate | 11 |
| Manganese Sulfate | 5 |
| Copper Sulfate | 1 |
| Calcium Iodate | less than 1 |
| Sodium Selenite | less than 1 |

Fig. 2

| Vitamin Pre-mix Ingredient | Percentage |
|---|---|
| Wheat Flour | 33 |
| Vitamin E | 18 |
| Niacin | 15 |
| Calcium Carbonate | 10 |
| Vitamin A | 6 |
| Calcium Pantothenate | 6 |
| Thiamine | 5 |
| Riboflavin | 2 |
| Vitamin B-12 | 2 |
| Pyridoxine Hydrochloride | 1 |
| Folic Acid | less than 1 |
| Vitamin D | less than 1 |
| Biotin | less than 1 |
| Menadione Sodium Bisulfite Complex | less than 1 |

Fig. 3

DIETARY SUPPLEMENT FOR ATHLETIC PETS

BACKGROUND OF THE INVENTION

This invention relates generally to food products for pets, and more particularly to dietary supplements for pets.

While pet care product customers presently have a host of suppliers and products to choose from, it may take substantial time, effort, and investigation to determine a product that best suits a particular pet's needs among the available alternatives. This is particularly true in the case of pet foods. While veterinarians and other professionals may assist in recommending a brand of pet food for a particular pet, pet foods are typically mass manufactured to meet the needs of an average pet within a selected range of pets, such as pet age and/or size. Nutritional needs, however, vary from pet to pet, and an optimal regimen of appropriate nutrients for a particular pet or breed of pet are beneficial. Nutritional requirements for more athletic pets, for example, canine athletes such as performing dogs, dogs utilized in athletic competitions (e.g. agility trials), sled dogs, hunting dogs and dogs used in law enforcement and rescue work, are especially important as the energy expended by these animals is unusually high over certain periods of time.

BRIEF SUMMARY OF THE INVENTION

In one aspect, a method is provided to help pets recover from periods of strenuous activity. The method comprises providing a source of carbohydrates that includes readily available glycogen and providing a replenishment source of vitamins, minerals, and antioxidants which are expended at a rate that is higher during the strenuous activity than during non-strenuous activity.

In another aspect, a food composition is provided that is formulated to prepare a pet for strenuous activity and replenish nutrients in a pet after strenuous activities. The food composition comprises carbohydrates which are easily assimilated by the pet and provide a readily available source of glucose, and vitamins, minerals, and antioxidants to replenish at least some of the vitamins, minerals and antioxidants that are expended at a rate that is higher during strenuous activity than during non-strenuous activity.

In another aspect, a method is provided for preparing a pet for strenuous activity and helping the pet recover from the strenuous activity comprising providing a food composition to the pet such that up to about three grams of carbohydrates per kilogram of body weight of the pet are provided to the pet.

In anther aspect, a method for providing an energy boost to a pet is provided that comprises providing a food composition to the pet which includes up to three grams of carbohydrates per kilogram of body weight of the pet and which includes a replenishment source of vitamins, minerals, and antioxidants that are expended during periods of strenuous activity.

BRIEF DESCRIPTION OF THE DRAWINGS

FIG. 1 is a table describing nutrient levels within a dietary supplement for pets.

FIG. 2 is a table describing one embodiment of a mineral premix formula for use within the dietary supplement described in FIG. 1.

FIG. 3 is a table describing one embodiment of a vitamin premix formula for use within the dietary supplement described in FIG. 1.

DETAILED DESCRIPTION OF THE INVENTION

For athletic pets and, in particular, working dogs, for example, canine athletes such as performing dogs, dogs utilized in athletic competitions (e.g. agility trials), sled dogs, hunting dogs, police dogs, rescue dogs and the like, high amounts of energy can be expended and physical recovery of the animal after expending such energy depends, at least in part, on the diet the pet receives. Similarly, domestic pets may expend high amounts of energy in bouts of play with members of their human family, such as children, and may appear at least temporarily exhausted afterwards. Major nutrient categories are moisture, carbohydrates, proteins, fats (lipids), fiber, vitamins and minerals. Receiving these nutrients in a proper balance, and at proper times, allows for increased performance and better recovery for the animals.

FIG. 1 is a table illustrating component ranges of a dietary supplement for pets that helps pets increase performance during strenuous activities and also helps pets recover after expending high amounts of energy. The dietary supplement helps the pets increase performance and physically recover by providing a convenient, ready to use, and easily dispensed source of complex and simple carbohydrates. In one embodiment, the dietary supplement is in a palatable form, similar to a treat, which provides the above described convenience and ease of use over known supplements. The dietary supplement is also easily assimilated by the pet, as the supplement provides a source of glucose polymers which are rapidly absorbed into the blood stream of the pet. The dietary supplement also provides vitamins, minerals, and antioxidants which are expended at higher rates during periods of high activity or exercise than during periods of low or moderate activity and exercise. While the embodiments described herein are described as being in a treat form, other embodiments of the supplement exist, for example, liquid and gel.

Diets high in calories from high quality sources of carbohydrates, proteins, and fats help improve athletic pet performance. Therefore, the right blend of nutrients can improve athletic pet performance and decrease physical recovery times of such athletic pets after performances. Carbohydrates are the best source of fuel for such pets. Carbohydrates efficiently supply the energy athletic pets need in performing their strenuous activities. During light to moderate activities, the body relies primarily on fat for energy. But during intense physical activities, such as those outlined above, an athletic pet's body utilizes glycogen to keep up a steady energy supply.

However, without a readily available replenishment source of glucose, the body harvests glycogen from the liver and converts it to glucose. Carbohydrates replenish the glucose supply in the blood, and may help to replenish glycogen supply in the liver. Therefore, such carbohydrates are important for energy before, during strenuous athletic activities performed by such athletic pets and after such performances, for re-filling depleted glycogen stores. Alternatively, if glycogen is obtained from the liver, the energy harvest in and of itself is another type of expended energy. Such expenditures are not rapidly made up by the body. The reactions must be repeated in reverse during replenishment of the liver, for example, and such processes take time. The food composition herein described provides a source of glucose for the blood which allows improved maintenance of blood glucose concentrations, and helps to prevent the time consuming removal and replenishment process for converting glycogen obtained from the liver. In addition, there is a direct relationship between blood glucose concentration after exercise and muscle glycogen replacement.

Referring specifically to FIG. 1, a dietary supplement for pets that provides such nutritional needs includes, in a specific embodiment, between about 0% and about 10% by weight brewer's yeast, between about 0% and about 5% by weight calcium phosphate, between about 0% and about 10% by weight cheese, between about 0% and about 20% by weight corn gluten meal, between about 0% and about 20% by weight corn syrup, between about 0% and about 10% by weight dextrose, between about 0% and about 15% by weight dried fruit, between about 0% and about 15% by weight fat, between about 0% and about 30% by weight fish, between about 0% and about 20% by weight glycerin, between about 0% and about 60% by weight maltodextrin, between about 0% and about 30% by weight meat, between about 0% and about 3% by weight mineral premix, between about 0% and about 10% by weight molasses, between about 0% and about 15% by weight nuts, between about 0% and about 30% by weight oatmeal, between about 0% and about 20% by weight pearled barley, between about 0% and about 5% by weight potassium gluconate, between about 0% and about 30% by weight poultry, between about 0% and about 2% by weight preservatives, between about 0% and about 20% by weight rice, between about 0% and about 60% by weight rice flour, between about 0% and about 3% by weight salt, between about 0% and about 20% by weight soybean meal, between about 0% and about 10% by weight sugar, between about 0% and about 1% by weight vanilla flavor, between about 0% and about 10% by weight vegetable oil, between about 0% and about 5% by weight vitamin C, between about 0% and about 5% by weight vitamin E, between about 0% and about 3% by weight vitamin premix, between about 0% and about 15% by weight wheat, between about 0% and about 15% by weight wheat flour, and between about 0% and about 15% by weight yogurt.

In one embodiment, the dietary supplement includes maltodextrin, a glucose polymer which provides a rapidly available source of glucose. Maltodextrin requires less hydration per glucose molecule than does the same amount of carbohydrate supplied as straight glucose. Maltodextrins provide a rapidly available source of glucose without inducing gastric distress, such as osmotic diarrhea and/or vomiting, which are often associated with bolus ingestion of straight glucose. As described further below, studies have demonstrated that post-exercise muscle glycogen replacement is enhanced if maltodextrins are administered within the first 15 to 30 minutes of recovery. The maltodextrin utilized in the dietary supplement described herein provides glucose more rapidly than longer chained carbohydrates such as starches and nearly as rapidly as straight glucose.

In one embodiment, the dietary supplement includes between about 15% and about 45% by weight maltodextrin. In a specific embodiment, the dietary supplement includes between about 25% and about 35% by weight maltodextrin. In a further embodiment, the dietary supplement includes greater than 30% by weight maltodextrin. Maltodextrin provides a supply of glucose to the blood at a rate faster than other sources of complex carbohydrates. In another embodiment, the dietary supplement provides between about 250 mg and about 350 mg of vitamin C, and between about 200 mg and about 400 mg of Vitamin E. By replenishing vitamin E, muscle damage which can occur during athletic events may be reduced or eliminated.

FIG. 2 is a table describing one embodiment of a mineral premix formula for use within the dietary supplement. The mineral premix includes about 66% salt, about 16% zinc sulfate, about 11% ferrous sulfate, about 5% manganese sulfate, about 1% copper sulfate, less than 1% calcium iodate, and less than 1% sodium selenite. It should be understood that other embodiments of a mineral premix formula exist, and the above described embodiment is intended as only one example of a mineral premix formula.

FIG. 3 is a table describing one embodiment of a vitamin premix formula for use within the dietary supplement. The vitamin premix includes about 33% wheat flour as the carrier, about 18% vitamin E, about 15% niacin, about 10% calcium carbonate, about 6% vitamin A, about 6% calcium pantothenate, about 5% thiamine, about 2% riboflavin, about 2% vitamin B-12, about 1% pyridoxine hydrochloride, and less than about 1% of each of folic acid, vitamin D, biotin, and menadione sodium bisulfite complex. It should be understood that other embodiments of a vitamin premix formula exist, and the above described embodiment is intended as only one example of a vitamin premix formula.

In a specific embodiment, the dietary supplement includes about 1.2% by weight calcium phosphate, about 2.0% by weight corn syrup, about 5.0% by weight dextrose, about 30.0% by weight maltodextrin, about 0.5% by weight mineral premix, about 2.5% by weight molasses, about 2.0% by weight potassium gluconate, about 53.5% by weight rice flour, about 1.0% by weight salt, about 1.2% by weight vitamin C, about 1.0% by weight vitamin E, and less than 0.1% by weight vitamin premix.

The above described dietary supplement contains simple and complex carbohydrates, antioxidants, vitamins, and minerals in a palatable treat form. The carbohydrate mixture provides a rapidly available energy (e.g. glucose) source. The antioxidants help replace those lost during exercise, and the vitamins and minerals ensure adequate intakes of these nutrients to counteract an increased demand for these nutrients during periods of exercise. In another embodiment, the antioxidant astaxanthin is included in the dietary supplement in an amount of about 0.5 mg to about 10 mg per serving of the dietary supplement.

The dietary supplement was tested on a group of dogs, and after having ingested the treat, the dogs showed an average increase in blood glucose of about 4 mg/dl within about 30 minutes after ingestion. After about an hour, there was an average increase in blood glucose of about 10 mg/dl. A control group of dogs that did not ingest the dietary supplement showed no change in blood glucose levels, and several had decreases in blood glucose levels of about −2 mg/dl.

In another study it was found that immediate post-exercise carbohydrate supplementation in a group of pets had replenishments of their glycogen stores to a level between about 90% to about 100% within 24 hours after the strenuous exercise. Pets that were not given the dietary supplement typically replenished their glycogen stores to about 75% of their pre-exercise concentrations within the 24 hour period. Should the athletic activities continue over a period of several days, it is easily understood how a 75% per day replenishment level could cause adverse effects, both in health and athletic ability of the pet, as complete muscle glycogen replacement between bouts of exercise may play an important role in maintaining the health and performance of animals working several days in a row.

In an exemplary embodiment, the dietary supplement compositions as described herein further generally include a nutritionally balanced mixture of proteinaceous and farinaceous ingredients. The dietary supplement compositions are not intended to be restricted to a specific listing of ingredients since such a listing is largely dependent on the desired nutritional balance for the dog and also on the availability of ingredients to the manufacturer. In addition to the proteinaceous and farinaceous materials described above, the dietary supplement compositions generally include vitamins, minerals, and other additives such as preservatives, emulsifiers and humectants. The specific percentages for each of the ingredients listed above, and shown in FIG. 1, including for example, the relative proportions of vitamins, minerals, fat, protein and carbohydrate, is determined by specific manufacturers.

To make one embodiment of the dietary supplement, the proteinaceous and farinaceous materials and additional desired materials, as chosen by availability and nutritional desirability, are combined in a typical dough mixer and well blended to form an admixture. The admixture is then formed into continuous rectangular ropes using a cold forming extruder. These ropes are fed onto a conveyor belt where they are cut into pieces by a guillotine or rotary cutting device. The pieces then pass into a cooling tunnel and are put into individual packages, which are eventually grouped into cases for shipment. The finished products can either be sold individually, or by the case.

The dietary supplement compositions described herein are not intended to be limited to a specific listing of ingredients because such ingredients will depend on such factors as, for example, the desired nutritional balance for the specific type of pet, the amount of strenuous activities performed by the pet, the exercise regimen of the pet, and availability of ingredients to the manufacturer. However, the dietary supplement compositions are intended to provide a carbohydrate source of glucose, to the pet quickly, for recovery after periods of strenuous activity, without causing gas and causing other internal problems such as hypo-glycemia, and osmotic diarrhea and/or vomiting. In one embodiment, the dietary supplement composition provides up to three grams of carbohydrates per kilogram of body weight of the pet.

The dietary supplement described herein is utilized to provide energy during strenuous activity and to promote glycogen replenishment between bouts of exercise. The dietary supplement also provides several nutrients that are utilized at higher levels during exercise (i.e. B-vitamins, minerals, and antioxidants). The dietary supplement therefore promotes stamina during exercise or other strenuous activities and can promote recovery between such periods. Further and in one embodiment, the dietary supplement is provided in a convenient and palatable form, such as in treat form or in a form similar to a treat. The convenient treat or treat-like form therefore makes it easier for the pet handler to administer at the proper time, and decreases the number of products that must be administered before, during, and after periods of strenuous physical activity. While the dietary supplement is described herein as being in a treat form, it is contemplated that the treat can be administered in other forms including, but not limited to, liquid and gel.

While the invention has been described in terms of various specific embodiments, those skilled in the art will recognize that the invention can be practiced with modification within the spirit and scope of the claims.

What is claimed is:

1. A pet food composition formulated to prepare a pet for strenuous activity and replenish nutrients in a pet after strenuous activities, said pet food composition comprising:
   between about 25% and about 35% by weight of maltodextrin;
   vitamins comprising about 200 mg to about 400 mg of vitamin E and from about 250 mg to about 350 mg of vitamin C;
   a mineral premix comprising
      about 66% by weight salt,
      about 16% by weight zinc sulfate,
      about 11% by weight ferrous sulfate,
      about 5% by weight manganese sulfate,
      about 1% by weight copper sulfate,
      less than 1% by weight calcium iodate, and
      less than 1% by weight sodium selenite; and
   wherein the antioxidants comprise between about 0.5 mg to about 10 mg of astaxanthin.

2. A pet food composition formulated to prepare a pet for strenuous activity and replenish nutrients in a pet after strenuous activities, said pet food composition comprising:
   about 1.2% by weight calcium phosphate;
   about 2.0% by weight corn syrup;
   about 5.0% by weight dextrose;
   about 30.0% by weight maltodextrin;
   about 0.5% by weight mineral premix;
   about 2.5% by weight molasses;
   about 2.0% by weight potassium gluconate;
   about 53.5% by weight rice flour;
   about 1.0% by weight salt;
   about 1.2% by weight vitamin C;
   about 1.0% by weight vitamin E; and
   less than 1% by weight vitamin premix.

3. A food composition according to claim 2 wherein said vitamin premix comprises:
   about 33% by weight wheat flour;
   about 18% by weight vitamin E;
   about 15% by weight niacin;
   about 10% by weight calcium carbonate;
   about 6% by weight vitamin A;
   about 6% by weight calcium pantothenate;
   about 5% by weight thiamine;
   about 2% by weight riboflavin;
   about 2% by weight vitamin B-12;
   about 1% by weight pyridoxine hydrochloride;
   less about 1% by weight of folic acid;
   less about 1% by weight of vitamin D;
   less about 1% by weight of biotin; and
   less about 1% by weight of menadione sodium bisulfite complex.

4. A food composition according to claim 1 wherein said composition is at least one of a solid treat, a liquid, and a gel.

\* \* \* \* \*